(12) United States Patent
Pinard Westendorf et al.

(10) Patent No.: US 10,596,516 B2
(45) Date of Patent: Mar. 24, 2020

(54) SYSTEM AND METHOD OF RECOVERING CARBON DIOXIDE FROM A STREAM OF GAS

(71) Applicant: General Electric Company, Schenectady, NY (US)

(72) Inventors: Tiffany Elizabeth Pinard Westendorf, Troy, NY (US); Paul Russell Wilson, Latham, NY (US); Rachel Lizabeth Farnum, Rensselaer, NY (US)

(73) Assignee: Baker Hughes, a GE company, LLC, Houston, TX (US)

( * ) Notice: Subject to any disclaimer, the term of this patent is extended or adjusted under 35 U.S.C. 154(b) by 587 days.

(21) Appl. No.: 15/084,058

(22) Filed: Mar. 29, 2016

(65) Prior Publication Data

US 2017/0282122 A1 Oct. 5, 2017

(51) Int. Cl.
  *B01D 53/14* (2006.01)
  *B01D 53/18* (2006.01)
  *B01D 53/62* (2006.01)
  *B01D 53/77* (2006.01)
  *B01D 53/78* (2006.01)

(52) U.S. Cl.
  CPC ......... *B01D 53/62* (2013.01); *B01D 53/1425* (2013.01); *B01D 53/1475* (2013.01); *B01D 53/1493* (2013.01); *B01D 53/18* (2013.01); *B01D 53/78* (2013.01); *B01D 2252/204* (2013.01); *B01D 2257/504* (2013.01); *B01D 2258/0283* (2013.01); *Y02C 10/06* (2013.01)

(58) Field of Classification Search
  CPC ........ B01D 2252/204; B01D 2257/504; B01D 2258/0283; B01D 53/1425; B01D 53/1475; B01D 53/1493; B01D 53/18; B01D 53/62; B01D 53/78; Y02C 10/06
  See application file for complete search history.

(56) References Cited

U.S. PATENT DOCUMENTS

| 8,030,509 B2 | 10/2011 | Perry et al. |
| 8,647,413 B2 | 2/2014 | Soloveichik et al. |
| 9,175,591 B2 | 11/2015 | Hamad |

(Continued)

OTHER PUBLICATIONS

Seo, Samuel et al.; "Phase-Change Ionic Liquids for Postcombustion CO2 Capture;" ACS Publications, American Chemical Society, Energy Fuels 2014; vol. 28, pp. 5968-5977.

(Continued)

*Primary Examiner* — Cabrena Holecek
(74) *Attorney, Agent, or Firm* — Baker Hughes Patent Organization

(57) ABSTRACT

A system for use in recovering carbon dioxide from a stream of gas includes an absorption unit configured to receive the stream of gas and a stream of liquid absorbent. The gas includes carbon dioxide and vaporized water, and the liquid absorbent is chemically reactive with the carbon dioxide to form a solidified carbon dioxide-rich absorbent material. The gas and the liquid absorbent are mixed in the absorption unit such that a slurry that includes the solidified carbon dioxide-rich absorbent material and condensed water is formed therein. The system also includes a transport mechanism coupled in communication with the absorption unit, wherein the transport mechanism is configured to channel the slurry downstream from the absorption unit.

11 Claims, 2 Drawing Sheets

(56) References Cited

U.S. PATENT DOCUMENTS

Figure 1:
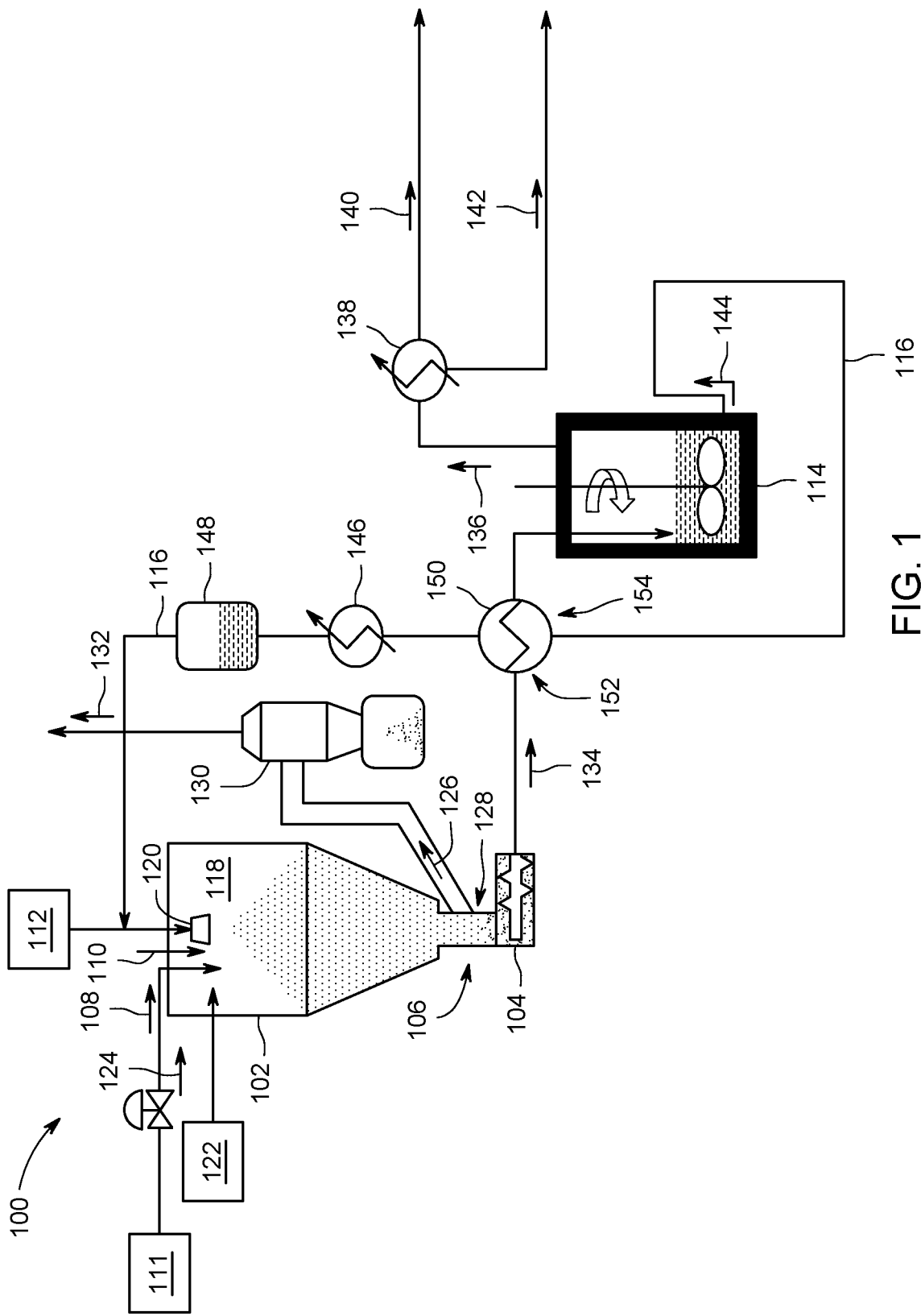

| | | | |
|---|---|---|---|
| 2008/0072495 A1* | 3/2008 | Waycuilis | B01D 53/14 |
| | | | 48/190 |
| 2012/0207659 A1* | 8/2012 | Pinard Westendorf | ...................... |
| | | | B01D 53/1425 |
| | | | 423/228 |
| 2013/0202517 A1 | 8/2013 | Ayala et al. | |
| 2013/0323148 A1 | 12/2013 | Vipperla | |
| 2014/0120015 A1 | 5/2014 | Perry et al. | |
| 2015/0004082 A1 | 1/2015 | Singh et al. | |

OTHER PUBLICATIONS

Perry, Robert J. et al.; "C02 Capture Using Phase-Changing Sorbents;" ACS Publications, American Chemical Society, Energy Fuels 2012; vol. 26, pp. 2528-2538.

* cited by examiner

SYSTEM AND METHOD OF RECOVERING CARBON DIOXIDE FROM A STREAM OF GAS

STATEMENT REGARDING FEDERALLY SPONSORED RESEARCH & DEVELOPMENT

This invention was made with Government support under contract number DE-FE0013687 awarded by the Department of Energy. The Government has certain rights in this invention.

BACKGROUND

The present disclosure relates generally to reducing emissions from power plant exhaust and, more specifically, to systems and methods of reducing emissions by recovering carbon dioxide from a gas stream.

Power generating processes that are based on combustion of carbon-containing fuel produce carbon dioxide as a byproduct. Typically, the carbon dioxide is one component of a mixture of gases that results from or passes unchanged through the combustion process. It may be desirable to capture or otherwise remove the carbon dioxide and other components of the gas mixture to prevent the release of the carbon dioxide and other components into the environment.

At least one known method for removing carbon dioxide from gas streams includes an absorptive/stripping-type regenerative process using aqueous monoethanolamine (MEA) or hindered amines like methyldiethanolamine (MDEA) and 2-amino-2-methyl-1-propanol (AMP). However, the process can sometimes result in sharp increases in the viscosity of the liquid absorbent, which can decrease the mass transfer of carbon dioxide into the absorbent. Moreover, energy consumption in the MEA process can be quite high, due in large part to the need for non-absorbing co-solvent (e.g., water) heating and evaporation. Furthermore, MEA-based absorption systems may not have the long-term thermal stability, in the presence of oxygen, in environments where regeneration temperatures typically reach at least about 120° C.

BRIEF DESCRIPTION

In one aspect, a system for use in recovering carbon dioxide from a stream of gas is provided. The system includes an absorption unit configured to receive the stream of gas and a stream of liquid absorbent. The gas includes carbon dioxide and vaporized water, and the liquid absorbent is chemically reactive with the carbon dioxide to form a solidified carbon dioxide-rich absorbent material. The gas and the liquid absorbent are mixed in the absorption unit such that a slurry that includes the solidified carbon dioxide-rich absorbent material and condensed water is formed therein. The system also includes a transport mechanism coupled in communication with the absorption unit, wherein the transport mechanism is configured to channel the slurry downstream from the absorption unit.

In another aspect, a method of recovering carbon dioxide from a stream of gas is provided. The method includes channeling the stream of gas towards an absorption unit, and channeling a stream of liquid absorbent towards the absorption unit. The gas includes carbon dioxide and vaporized water, and the liquid absorbent is chemically reactive with the carbon dioxide to form a solidified carbon dioxide-rich absorbent material. The method further includes mixing the gas and liquid absorbent in the absorption unit such that a slurry that includes the solidified carbon dioxide-rich absorbent material and condensed water is formed, and discharging the slurry from the absorption unit.

DRAWINGS

Figure 2:
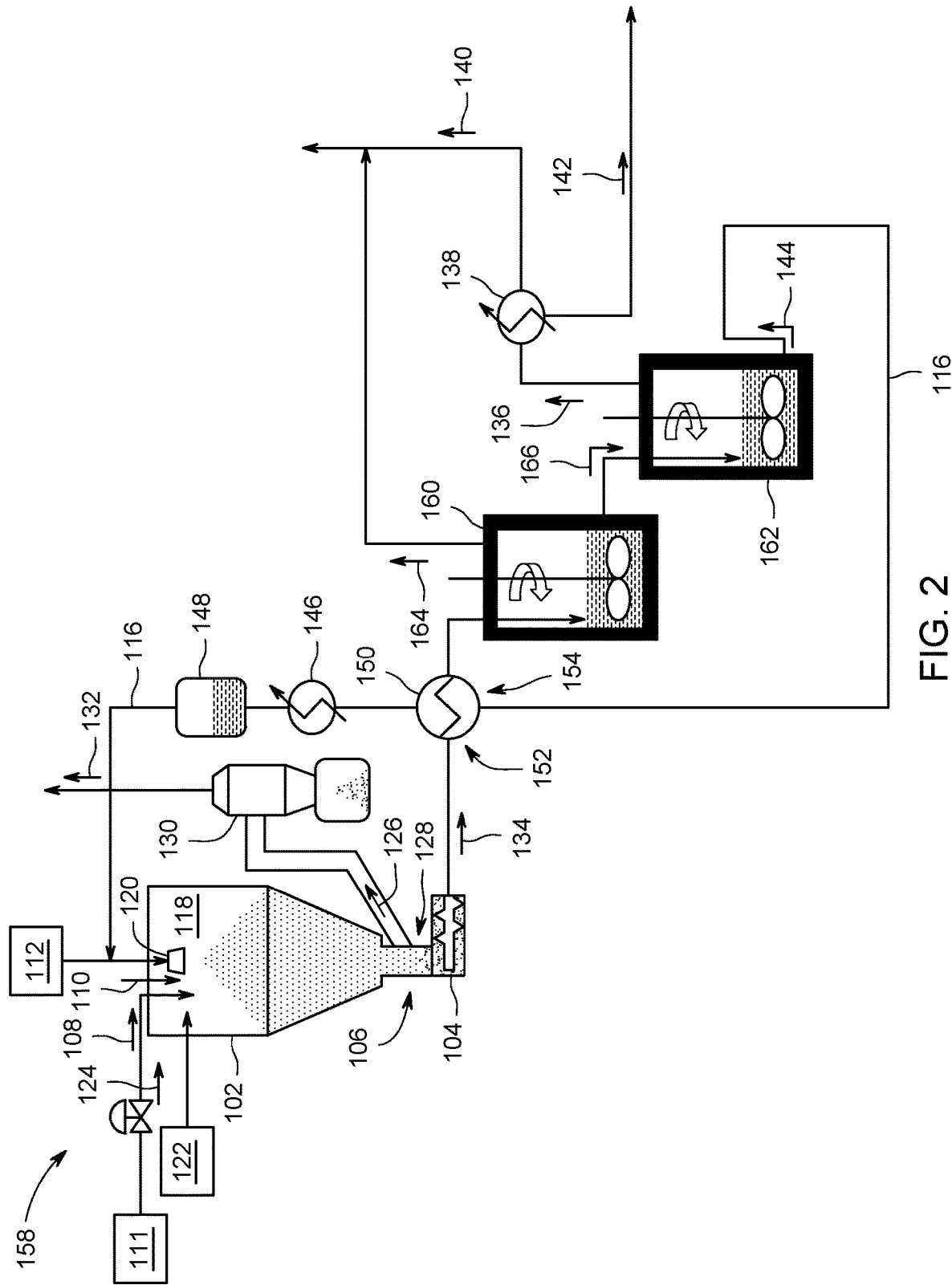

These and other features, aspects, and advantages of the present disclosure will become better understood when the following detailed description is read with reference to the accompanying drawings in which like characters represent like parts throughout the drawings, wherein:

FIG. 1 is a schematic diagram of an exemplary system for use in recovering carbon dioxide from a stream of gas; and FIG. 2 is a schematic diagram of an alternative system for use in recovering carbon dioxide from a stream of gas.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to systems and methods of reducing emissions by recovering carbon dioxide from a gas stream. In the exemplary embodiment, a liquid absorbent that solidifies upon reaction with carbon dioxide is used to extract carbon dioxide from the gas stream. More specifically, the gas stream and the liquid absorbent are mixed within an absorption unit, such that a solidified carbon dioxide-rich absorbent material is formed. The gas stream also contains vaporized water that, when condensed within the absorption unit, mixes with the solidified carbon dioxide-rich absorbent material to form a slurry product within the absorption unit. The slurry product is then discharged from an outlet of the absorption unit, and a transport mechanism capable of conveying slurry channels the slurry product downstream from the absorption unit for further processing. As such, the systems and methods described herein embody the process changes and equipment for use in recovering carbon dioxide from a carbon dioxide-rich gas stream containing high humidity, which is an inherent product of combustion of carbon-containing fuel in power generation plants, integrated gasification combined cycle plants, and natural gas sweetening, for example.

FIG. 1 is a schematic diagram of an exemplary system 100 for use in recovering carbon dioxide from a stream of gas. In the exemplary embodiment, system 100 includes an absorption unit 102 and a transport mechanism 104 coupled in communication with a first outlet 106 of absorption unit 102. Absorption unit 102 receives a stream 108 of gas and a stream 110 of liquid absorbent. More specifically, stream 108 of gas is a product of combustion, and inherently includes carbon dioxide and vaporized water. Non-limiting examples of sources of stream 108 of gas include gas streams originating from a combustion process, a gasification process, a landfill, a furnace (e.g., blast furnace or chemical reduction furnace), a steam generator, a boiler, and combinations including at least two of the foregoing examples. In one embodiment, stream 108 of gas is a flue stream originating in a coal-fired plant 111 (e.g., a power plant).

Any liquid absorbent may be channeled towards and received within absorption unit 102 that enables system 100 to function as described herein. More specifically, the liquid absorbent utilized herein is a phase-changing material that is chemically reactive with the carbon dioxide in stream 108 of gas to form a solidified carbon dioxide-rich absorbent material. For example, in one embodiment, the liquid absorbent is an aminosilicone absorbent material. Alternatively, the liquid absorbent includes at least one amine component such as, but not limited to, an aliphatic primary or secondary amine material, a polyamine material, a polyimine material (e.g., polyalkyleneimines), a cyclic amine material, an amidine compound, a hindered amine material, an aminosiloxane compound, an amino acid material, and combinations thereof.

System 100 also includes a source 112 of liquid absorbent that selectively channels the liquid absorbent towards absorption unit 102. More specifically, source 112 of liquid absorbent contains fresh (i.e., never used) liquid absorbent for use within absorption unit 102. Moreover, as will be described in more detail below, system 100 includes at least one regeneration unit 114 and a recycle line 116 coupled between absorption unit 102 and regeneration unit 114. Recycle line 116 channels regenerated liquid absorbent towards absorption unit 102 for use in combination with, or alternatively to, the fresh liquid absorbent channeled from source 112 of liquid absorbent.

In the exemplary embodiment, absorption unit 102 is a hollow vessel including a reaction chamber 118 in which the gas and the liquid absorbent are mixed such that a slurry that includes the solidified carbon dioxide-rich absorbent material and condensed water is formed therein. More specifically, absorption unit 102 includes a spray device 120 that atomizes the liquid absorbent into droplets prior to mixing the gas and the liquid absorbent. Atomizing the liquid absorbent into droplets facilitates providing an increased mass transfer surface area between the liquid absorbent droplets and the carbon dioxide-rich gas to facilitate formation of the solidified carbon dioxide-rich absorbent material. More specifically, the selected size for the droplets of liquid absorbent is based on factors such as the composition of the absorbent material (e.g., the reactivity of the absorbent with the carbon dioxide-rich gas), and the type and design of the reaction chamber. In one embodiment, the average diameter size of the droplets is less than or equal to 1,000 micrometers ($\mu m$). In another embodiment, such as when a venturi scrubber is used as reaction chamber 118, the average diameter size of the droplets is defined within a range between about 10 $\mu m$ and about 100 $\mu m$.

In some embodiments, the liquid absorbent reacts with the carbon dioxide in stream 108 of gas in about a 1:1 stoichiometric ratio. As such, the slurry is formed from the solidified carbon dioxide-rich absorbent material and condensed water from stream 108 of gas. Alternatively, additional material may be added to reaction chamber 118 to facilitate formation of the slurry, and to dynamically adjust a desired viscosity of the slurry. For example, in one embodiment, the flow rate of liquid absorbent from source 112 of liquid absorbent, and/or recycle line 116, compared to the flow rate of gas from stream 108 of gas is such that the stoichiometric ratio of the liquid absorbent to the carbon dioxide is greater than 1:1. As such, the slurry includes the solidified carbon dioxide-rich absorbent material, the condensed water, and excess liquid absorbent.

In an alternative embodiment, system 100 includes a source 122 of non-absorbing co-solvent that channels a stream 124 of non-absorbing co-solvent towards absorption unit 102 such that the slurry includes the solidified carbon dioxide-rich absorbent material, the condensed water, and the non-absorbing co-solvent. Any suitable non-absorbing co-solvent may be utilized within reaction chamber 118 that enables system 100 to function as described herein. For example, the non-absorbing co-solvent is not chemically reactive with the carbon dioxide or other components of the gas such that slurry production is favored when the non-absorbing co-solvent is mixed the products of reaction chamber 118. An exemplary non-absorbing co-solvent includes, but is not limited to, triethylene glycol.

As described above, mixing the gas and the liquid absorbent within reaction chamber 118 facilitates recovering carbon dioxide. The slurry is then gravity fed and discharged from first outlet 106 of absorption unit 102, and a stream 126 of carbon dioxide-lean gas is discharged from a second outlet 128 of absorption unit 102. Alternatively, the slurry is discharged from first outlet 106 with a mechanical agitation device. Stream 126 is channeled towards a cyclone separation unit 130, which facilitates separating residual solidified carbon dioxide-rich absorbent (e.g., solids, liquid droplets, and mixtures thereof) from the carbon dioxide-lean gas. As such, a stream 132 of stripped gas is discharged from cyclone separation unit 130.

As described above, transport mechanism 104 is coupled in communication with first outlet 106 of absorption unit 102. Transport mechanism 104 channels the slurry discharged from first outlet 106 of absorption unit 102 downstream from absorption unit 102. Transport mechanism 104 is any device capable of conveying a slurry product from one location to another. For example, transport mechanism 104 includes at least one of a progressive cavity pump, a diaphragm pump, a positive displacement pump, or an actuating piston device.

A flow 134 of slurry is discharged from absorption unit 102 and received within regeneration unit 114. Regeneration unit 114 operates at about atmospheric conditions, and heats the slurry such that the carbon dioxide is separated from the liquid absorbent. More specifically, the carbon dioxide is vaporized along with the condensed water, and a stream 136 of carbon dioxide and water is channeled towards a condenser 138. Condenser 138 separates the vaporized carbon dioxide and water such that a stream 140 of carbon dioxide and a stream 142 of condensed water is discharged therefrom.

A stream 144 of regenerated liquid absorbent is also discharged from regeneration unit 114. Stream 144 is channeled towards and stored within reservoir 148, and selectively channeled towards absorption unit 102 along recycle line 116 for further use in absorbing carbon dioxide from the gas.

In one embodiment, the regenerated liquid absorbent is cooled before being stored within reservoir 148. More specifically, a heat exchanger 150 is coupled along recycle line 116, and also between absorption unit 102 and regeneration unit 114. Heat exchanger 150 includes a cold side 152 and a hot side 154. Cold side 152 receives flow 134 of slurry from absorption unit 102, and hot side 154 receives stream 144 of regenerated liquid absorbent from regeneration unit 114 such that heat is transferred between the slurry and the regenerated liquid absorbent. As such, the slurry is preheated prior to being received within regeneration unit 114, thereby increasing the overall efficiency of system 100. Moreover, a chiller 146 is positioned along recycle line 116 downstream from heat exchanger 150. Chiller 146 further cools the regenerated liquid absorbent before being stored within reservoir 148 and reintroduced into reaction chamber 118.

FIG. 2 is a schematic diagram of a system 158 for use in recovering carbon dioxide from a stream of gas, in accordance with a second embodiment of the disclosure. In the exemplary embodiment, system 158 includes a first regeneration unit 160 and a second regeneration unit 162. First regeneration unit 160 receives flow 134 of slurry discharged from absorption unit 102, and operates at an elevated pressure greater than atmospheric pressure. In one embodiment, the elevated pressure is defined within a range between about 1 bar and about 10 bar. As such, only a portion of the carbon dioxide is desorbed from the solidified carbon dioxide-rich absorbent material. However, recovered carbon dioxide in a stream 164 discharged from first regeneration unit 160 is compressed, which reduces the need to further compress the recovered carbon dioxide prior to storage or utilization. A stream 166 of partially regenerated slurry is then channeled towards second regeneration unit 162, which operates at about atmospheric conditions to heat the partially regenerated slurry and further separate the carbon dioxide from the liquid absorbent.

An exemplary technical effect of the system and methods described herein includes at least one of: (a) recovering carbon dioxide from a contaminated gas stream; (b) providing means for transporting and a regenerating liquid absorbent from a slurry generated within an absorption unit; and (c) increasing the overall efficiency of the system by utilizing integrated heat exchange.

Exemplary embodiments of carbon dioxide recovery system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only power generation plants and related methods as described herein. Rather, the exemplary embodiment can be implemented and utilized in connection with many applications where recovering carbon dioxide from a gas stream is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for use in recovering carbon dioxide from a stream of gas, said system comprising:
   a stream of gas including carbon dioxide and vaporized water;
   a stream of liquid absorbent that is chemically reactive with the carbon dioxide to form a solidified carbon dioxide-rich absorbent material;
   a slurry including a solidified carbon dioxide-rich absorbent material and condensed water formed from the vaporized water;
   an absorption unit configured to receive the stream of gas and the stream of liquid absorbent, within which the liquid absorbent chemically reacts with the carbon dioxide to form a solidified carbon dioxide-rich absorbent material, wherein the gas and the liquid absorbent are mixed in said absorption unit to form the slurry and a stream of carbon dioxide-lean gas, the absorption unit including a first outlet and a second outlet, the second outlet directly coupled to the first outlet;
   a separation unit directly coupled to the second outlet of the absorption unit and configured to receive the carbon dioxide-lean gas; and
   a transport mechanism coupled directly to the first outlet of the absorption unit and configured to channel the slurry that exits the first outlet of the absorption unit downstream from said absorption unit.

2. The system in accordance with claim 1, wherein said transport mechanism comprises at least one of a progressive cavity pump, a diaphragm pump, a positive displacement pump, or an actuating piston device.

3. The system in accordance with claim 1 further comprising a source of liquid absorbent to supply the stream of liquid absorbent towards said absorption unit, wherein the liquid absorbent is an aminosilicone absorbent material.

4. The system in accordance with claim 3, wherein said source of liquid absorbent is configured to channel the stream of liquid absorbent at a flow rate such that a stoichiometric ratio of the liquid absorbent to carbon dioxide is greater than one-to-one, and such that the slurry includes the solidified carbon dioxide-rich absorbent material, the condensed water, and excess liquid absorbent.

5. The system in accordance with claim 1, wherein said absorption unit comprises a spray device configured to atomize the liquid absorbent prior to mixing the gas and the liquid absorbent.

6. The system in accordance with claim 1 further comprising at least one regeneration unit configured to receive the slurry from said absorption unit, wherein said at least one regeneration unit is configured to heat the slurry such that the solidified carbon dioxide-rich absorbent is separated from the liquid absorbent, thereby forming regenerated liquid absorbent.

7. The system in accordance with claim 6 further comprising a recycle line coupled between said absorption unit and said at least one regeneration unit, wherein said recycle line is configured to channel the regenerated liquid absorbent towards said absorption unit.

8. The system in accordance with claim 6 further comprising a heat exchanger that comprises a cold side and a hot side, wherein said cold side is configured to receive a flow of the slurry and said hot side is configured to receive a stream of the regenerated liquid absorbent such that heat is transferred between the slurry and the regenerated liquid absorbent.

9. The system in accordance with claim 8, wherein said heat exchanger is configured to discharge a stream of heated slurry from said cold side of said heat exchanger, and to channel the stream of heated slurry towards said at least one regeneration unit.

10. The system in accordance with claim 1 further comprising a source of non-absorbing co-solvent to supply a stream of non-absorbing co-solvent towards said absorption unit such that the slurry includes the solidified carbon dioxide-rich absorbent material, the condensed water, and the non-absorbing co-solvent.

11. The system in accordance with claim 1 further comprising a power plant configured to channel the stream of gas towards said absorption unit.

* * * * *